(12) United States Patent
Goodman et al.

(10) Patent No.: US 8,423,602 B2
(45) Date of Patent: Apr. 16, 2013

(54) WEB SERVICE BROADCAST ENGINE

(75) Inventors: Brian D. Goodman, New York, NY (US); Maheshwar Rao Inampudi, Aurora, IL (US)

(73) Assignee: International Business Machines Corporation, Armonk, NY (US)

( * ) Notice: Subject to any disclaimer, the term of this patent is extended or adjusted under 35 U.S.C. 154(b) by 2900 days.

(21) Appl. No.: 10/964,126

(22) Filed: Oct. 13, 2004

(65) Prior Publication Data

US 2006/0080394 A1    Apr. 13, 2006

(51) Int. Cl.
*G06F 15/16* (2006.01)
*G06F 3/00* (2006.01)

(52) U.S. Cl.
USPC .......................................... 709/203; 719/318

(58) Field of Classification Search ................. 709/203; 719/318
See application file for complete search history.

(56) References Cited

U.S. PATENT DOCUMENTS

| | | | |
|---|---|---|---|
| 5,721,825 A * | 2/1998 | Lawson et al. | 709/203 |
| 6,158,007 A * | 12/2000 | Moreh et al. | 726/1 |
| 6,556,659 B1 * | 4/2003 | Bowman-Amuah | 379/9.04 |
| 6,631,363 B1 * | 10/2003 | Brown et al. | 707/1 |
| 2003/0005181 A1 | 1/2003 | Bau, III et al. | |
| 2003/0018714 A1 * | 1/2003 | Mikhailov et al. | 709/203 |
| 2003/0028598 A1 * | 2/2003 | Moller et al. | 709/205 |
| 2003/0055829 A1 * | 3/2003 | Kambo et al. | 707/100 |
| 2003/0093467 A1 * | 5/2003 | Anderson | 709/203 |
| 2003/0101190 A1 | 5/2003 | Horvitz et al. | |
| 2003/0237049 A1 | 12/2003 | Sawicki et al. | |
| 2004/0024767 A1 * | 2/2004 | Chen | 707/100 |
| 2004/0064387 A1 | 4/2004 | Clarke et al. | |
| 2004/0068481 A1 | 4/2004 | Seshadri et al. | |
| 2004/0193678 A1 * | 9/2004 | Trufinescu et al. | 709/203 |
| 2006/0056628 A1 * | 3/2006 | Todd | 380/233 |

FOREIGN PATENT DOCUMENTS

JP      2002-82817      3/2002

* cited by examiner

*Primary Examiner* — Guang Li
(74) *Attorney, Agent, or Firm* — Gibb & Riley, LLC

(57) ABSTRACT

A system, computer architecture, and method of enabling asynchronous callback and broadcast notification between a server and a client software application in a network, wherein the method comprises processing computer logic instructions in the network; requesting a notification of a completion of the processing of the computer logic instructions; storing the notification request in a registry; queuing the notification request according to a response to the notification request and a list of user endpoints requesting the notification of a completion of the processing of the computer logic instructions; and notifying a recipient system of the completion of the processing of the computer logic instructions upon execution of the queued notification request.

38 Claims, 10 Drawing Sheets

FIG. 6

```
<SOAP:Envelope xmlns:SOAP="http://schemas.xmlsoap.org/soap/envelope/">
 <SOAP:Header>
   <CorrelationID>A12B4WNMYSXUIOV865</CorrelationID >
 </SOAP:Header>
 <SOAP:Body>
   <m:delivery xmlns:m="urn:soapserver/soap:MailDeliveryModule">
     <Address>2686, Leylan Ln, Aurora, IL - 60504</Address>
     <PhoneNumber>630.499.9910</PhoneNumber>
   </m:delivery>
 </SOAP:Body>
</SOAP:Envelope>
```

WEB SERVICE BROADCAST ENGINE

BACKGROUND OF THE INVENTION

1. Field of the Invention

The embodiments of the invention generally relate to web services, and more particularly to systems and methods for implementing asynchronous broadcast web services.

2. Description of the Related Art

With the advent of open standards based technology, such as SOAP (Simple Object Access Protocol), UDDI (Universal Description Discovery Integration), and WS-Security (proposed security standards for secure web services such as those offered by IBM Corporation, Microsoft Corporation, and VeriSign, Inc.), there is a growing need to make the technology support enterprise level requirements. Until recently, a missing feature in the web services arena was the notion of a callback. Web services are most often thought of as remote procedure calls (RPC) using an extensible Markup Language (XML) format. Callbacks are often used for an asynchronous process where computer code requests notification when processing has completed or an event has occurred. This event might be a message in response to a callback or a subscription. This allows for a system to submit a request and not have to wait, but is assured of notification without polling for status. Polling occurs when an application or system requests a status to monitor a change or result. The change might be progress on an asynchronous task or alternatively the result of an asynchronous task. Polling is often used when the system does not support event driven operations.

As with many conventional standards for web service callbacks, the real task involves implementing the definition in a scalable performance oriented solution. By assuming that the system registers and receives a callback, there is a need for the development of a system for the wide distribution of such a callback system. Clearly, the register and callback in a one-off scenario is effective. Other conventional approaches utilize a framework supporting event subscription and event notification in the context of web services. Yet another conventional approach uses a standard topic based PubSub pattern using web services. Traditional broadcast level messaging is often referred to as publish subscribe (PubSub). Additionally, PubSub is a web-based matching service that instantly notifies a user when new content is created that matches the user's profile (i.e., subscription) and is available from PubSub Concepts, Inc., New York, N.Y., USA.

In an enterprise (i.e., business network) there are efficiencies that can be gained by leveraging the so-called "one-to-many paradigm." The theory is that more than one user will request notification of the same event. However, one drawback of traditional PubSub systems is that they tend to maintain a socket connection between the client and server. A socket connection is a software object than connects a software application to a network protocol. Maintaining a socket connection ties up finite resource on the server and falls victim to the increasingly mobile client base and the intermittent connectivity experienced by many users on many devices.

Another drawback is the inflexible tightly coupled relationship between the client and server. While there are systems that have decoupled the publishing interface from the broadcast interface, there is a general notion that the entity registering for a callback will be the entity receiving the callback. However, this might not necessarily be the case. Moreover, general PubSub and messaging architectures do not provide callback functionality, as they are a technology component supporting messaging, and the manner in which they are used is not their primary concern.

Other conventional approaches provide potential standards for the XML messages, which a system may use to enable standardized callback and event notification. However, these conventional approaches tend to fail to describe the solution to communicate the messages. There are other conventional standards and current models for broadcast messaging. In each case there are advantages and disadvantages. The major advantages and disadvantages for the conventional approaches are described below. Specifically, the PubSub pattern is the most attractive. It offers the most obvious application at a design pattern level and even as an out of the box solution. As with the other conventional solutions, it too has its drawbacks.

PubSub requires persistent connections and vendor specific solutions to differentiate offerings in the marketplace. Open standards based solutions allow for more interoperability but some features and performance is lost with the standard generic interfaces. Moreover, PubSub solutions are generally so generic that workflow or routing of messages is done at another layer or in the applications leveraging the message bus. Out of the box solutions offer compelling message distribution, but tend to fail to minimize client/server dependencies and continued client/server connections.

The advantages of SOAP over PubSub is that it is fast and efficient in FAF (Fire and Forget) mode. However, the disadvantages are that SOAP over PubSub requires a persistent network connection, it requires a proprietary protocol (SOAP rides on top of the PubSub protocol), and a message delivery is assumed to be a subscriber. The advantages of SOAP over message queue systems are that SOAP has a robust message delivery, workflow integration, and an option for guaranteed delivery. However, the disadvantages are that SOAP is not as scalable as PubSub, it is not considered fast, it requires a proprietary protocol as SOAP rides on top of the underlying messaging protocol. The advantages of "Hand Rolled" web services callback are that it is simple, it supports many proposed standards, it offers loose coupling. However, the disadvantages involve scalability and performance issues.

Each of the conventional approaches is an example of the need for enterprise level callback and broadcast notification. Moreover, each of these proposed standards focuses on the messaging aspect of the solutions. The missing element in each of the approach is the engine (i.e., framework) that is used to support a PubSub-like operation with the disconnected flexibility of the common RPC or web services perspective. Therefore, there remains a need for such a web services broadcast engine (i.e., framework) capable of supporting a PubSub-like operation.

SUMMARY OF THE INVENTION

In view of the foregoing, an embodiment of the invention provides a method of enabling asynchronous callback and broadcast notification between a server and a client software application in a network, wherein the method comprises processing computer logic instructions in the network; requesting, by the client software application, a notification of a completion of the processing of the computer logic instructions; storing the notification request in a registry; queuing the notification request according to a response to the notification request and a list of system endpoints requesting the notification of a completion of the processing of the computer logic instructions; and notifying a recipient system of the completion of the processing of the computer logic instructions upon execution of the queued notification request, wherein the notification comprises a callback request, and wherein the recipient system comprises the client software application corresponding with the system endpoints. The requesting process comprises sending the notification request to the server; identifying a system endpoint requiring notification of completion of the processing of the computer logic instructions; specifying computer logic instructions requiring notification for an identified system endpoint; generating a message of the specific computer logic instructions requiring notification; and sending the message to a register notification interface. Moreover, the system endpoint comprises a target Uniform Resource Identifier (URI). Additionally, the requesting process further comprises storing the message into a storage device; generating a unique identifier for the specific computer logic instructions requiring notification; and generating a response message by matching the unique identifier with a corresponding system endpoint requiring notification of completion of the processing of the computer logic instructions.

The method further comprises tracking the response message using persistent mapping to track the unique identifier in the network. Furthermore, the storing process comprises creating an event object for each notification request. Moreover, the notification comprises at least one event object and the execution of the queued notification request comprises managing a socket connection between the server and the client software application. In one embodiment, the recipient system is different from the client software application. Alternatively, the recipient system comprises the client software application.

The embodiments of the invention also provide a program storage device readable by computer, tangibly embodying a program of instructions executable by the computer to perform the method of enabling asynchronous callback and broadcast notification between a server and a client software application in a network.

Another embodiment of the invention provides a web service broadcast engine for enabling asynchronous callback and broadcast notification between a server and a client software application in a network, wherein the web service broadcast engine comprises means for processing computer logic instructions in the network; means for requesting, by the client software application, a notification of a completion of the processing of the computer logic instructions; means for storing the notification request in a registry; means for queuing the notification request according to a response to the notification request and a list of system endpoints requesting the notification of a completion of the processing of the computer logic instructions; and means for notifying a recipient system of the completion of the processing of the computer logic instructions upon execution of the queued notification request.

Another embodiment of the invention provides a system for enabling asynchronous callback and broadcast notification between a server and a client software application, wherein the system comprises a server adapted to process computer logic instructions in a network; an endpoint client software application adapted to request the server for a notification of a completion of the processing of the computer logic instructions; a registry in the server adapted to store the notification request; a queue adapted for queuing the notification request according to a response to the notification request and a list of system endpoints requesting the notification of a completion of the processing of the computer logic instructions; and a message processor adapted to notify a recipient system of the completion of the processing of the computer logic instructions upon execution of the queued notification request, wherein the notification comprises a callback request, and wherein the client software application corresponds with the system endpoints.

The server comprises a first computer architecture component adapted to identify a system endpoint requiring notification of completion of the processing of the computer logic instructions; a second computer architecture component adapted to specify computer logic instructions requiring notification for the identified system endpoint; and a register notification interface adapted to process a message of the specific computer logic instructions requiring notification. The system endpoint comprises a target Uniform Resource Identifier (URI). The server further comprises a persistent storage device adapted to store the message and a unique identifier for the specific computer logic instructions requiring notification, wherein the message processor is adapted to generate a response message by matching the unique identifier with a corresponding system endpoint requiring notification of completion of the processing of the computer logic instructions.

The server is adapted to track the response message using persistent mapping to track the unique identifier until the notification reaches the system endpoint. The registry is adapted to create an event object for each notification request. Moreover, the notification comprises at least one event object. Additionally, the message processor is adapted to manage a socket connection between the server and the client software application. In one embodiment, the recipient system is different from the client software application. In another embodiment, the recipient system comprises the client software application. Furthermore, in one embodiment, the network comprises a web services network.

Emerging standards currently cover the need for a web services callback mechanism. The embodiments of the invention provide computer architecture, a system, and method for communicating a web service response in an asynchronous broadcast. In an enterprise environment, the embodiments of the invention gain efficiencies over the conventional systems by eliminating the dependency on persistent connections. Furthermore, the likelihood that a callback or event notification is desired by more than one application in an enterprise is high and, as such, the system provided by the embodiments of the invention address that need by mapping events to registered callbacks and processing them in a parallel asynchronous manner.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 6 is an example of a SOAP message according to an embodiment of the invention;

DETAILED DESCRIPTION OF PREFERRED EMBODIMENTS OF THE INVENTION

Figure 1:
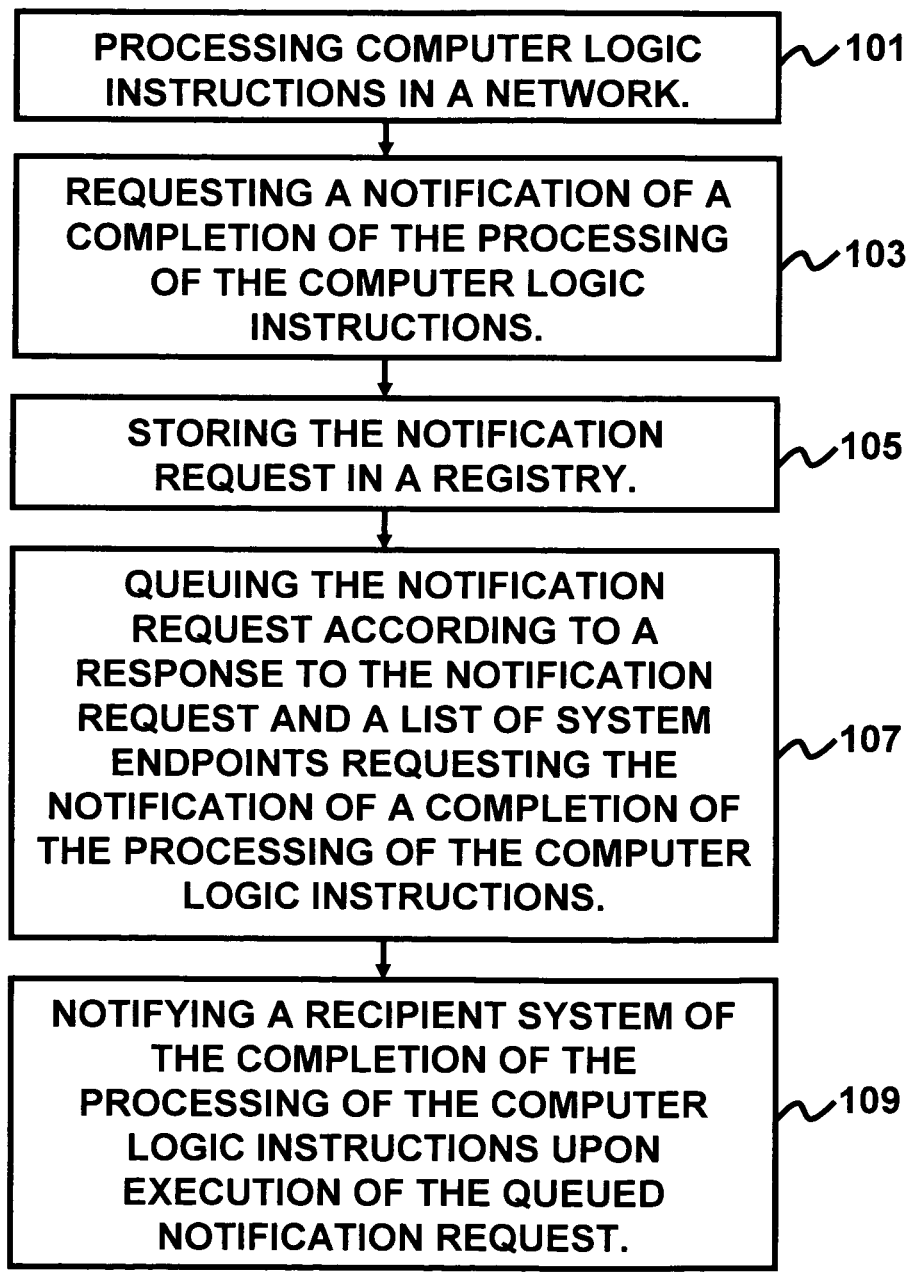
FIG. 1 is a flow diagram illustrating a preferred method of an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a web services broadcast engine (i.e., framework) capable of supporting a PubSub-like operation. The embodiments of the invention address these needs by providing a system, method, and computer architecture for a loosely coupled web services based broadcast engine, which communicates an XML response to a requestor or third party in an asynchronous broadcast-like manner. While the computer code demonstrating the system of the embodiments of the invention does not employ a standard such as web services (WS)-callback, it is assumed that any suitable protocol for registering callback notification is acceptable. Moreover, the system provided by the embodiments of the invention is based on a J2EE® web application environment (Java® 2 Platform Enterprise Edition), available from Sun Microsystems, Inc., Santa Clara, Calif., USA, but does not require one. More particularly, the embodiments of the invention provide a system by which callback notifications are stored, queued, and processed to enable asynchronous broadcast completing a callback transaction. Referring now to the drawings and more particularly to FIGS. 1 through 10 where similar reference characters denote corresponding features consistently throughout the figures, there are shown preferred embodiments of the invention.

FIG. 1 illustrates a flow diagram for a method of enabling asynchronous callback and broadcast notification between a server and a client software application in a web services network, in accordance with an embodiment of the invention. The method illustrated in FIG. 1 comprises processing (101) computer logic instructions in the network; requesting (103), by the client software application, a notification of a completion of the processing of the computer logic instructions; storing (105) the notification request in a registry; queuing (107) the notification request according to a response to the notification request and a list of system endpoints requesting the notification of a completion of the processing of the computer logic instructions; and notifying (109) a recipient system of the completion of the processing of the computer logic instructions upon execution of the queued notification request.

The notification comprises a callback request, and wherein the recipient system comprises the client software application corresponding with the system endpoints. The requesting process (103) comprises sending the notification request to the server; identifying a system endpoint requiring notification of completion of the processing of the computer logic instructions; specifying computer logic instructions requiring notification for an identified system endpoint; generating a message of the specific computer logic instructions requiring notification; and sending the message to a register notification interface. In the identifying process, the system endpoint comprises a target Uniform Resource Identifier (URI).

The requesting process (103) further comprises storing the message into a storage device; generating a unique identifier for the specific computer logic instructions requiring notification; and generating a response message by matching the unique identifier with a corresponding system endpoint requiring notification of completion of the processing of the computer logic instructions. The method further comprises tracking the response message using persistent mapping to track the unique identifier in the network. Moreover, the storing process (105) comprises creating an event object for each notification request. In one embodiment, the event object is reused across all notifications. Additionally, the notification comprises at least one event object and the execution of the queued notification request comprises managing a socket connection between the server and the client software application. In one embodiment, the recipient system is different from the client software application. Alternatively, the recipient system comprises the client software application.

Figure 2:
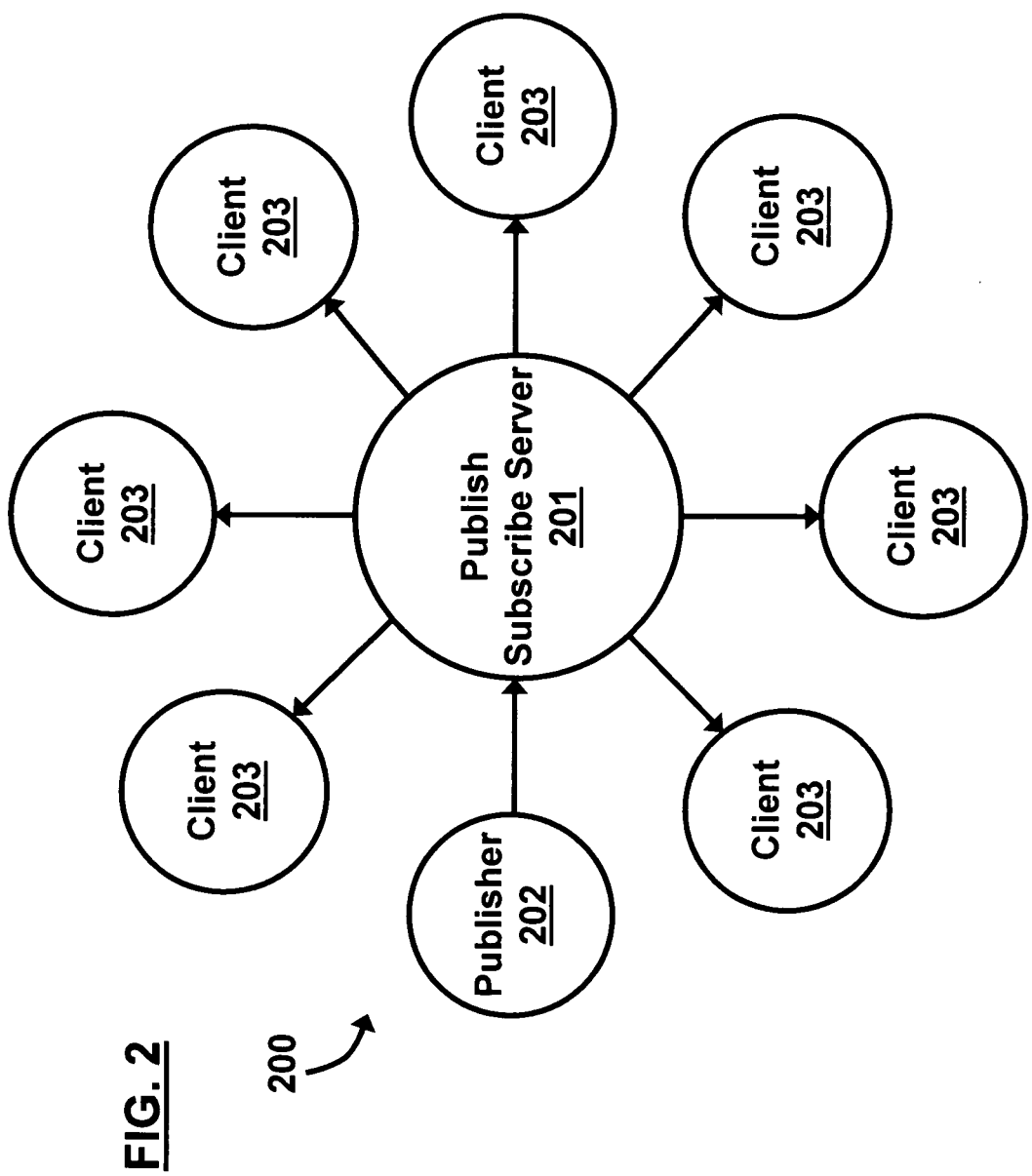
FIG. 2 is a schematic diagram of a PubSub architecture as implemented by an embodiment of the invention.

FIG. 2 depicts the high level architecture 200 of a Publish Subscribe (PubSub) pattern that will be implemented by the embodiments of the invention. A Publisher 202 registers with a central PubSub server 201 to publish its web messages on the PubSub server 201. While FIG. 2 illustrates only one publisher 202, the embodiments of the invention support multiple. Moreover, the clients 203 request messages based on channels (denoted by the arrows in FIG. 2 pointing to each client 203), wherein the channels provide means to filter the messages by a particular topic. The topics are arbitrary strings that allow message delivery to only interested clients 203. In other words, the clients 203 request web messages from the PubSub server 201 according to the predetermined client profile, which may include instructions for receiving web messages comprising specific content. As such, the publishers 202 distribute messages on a queue uniquely identified by topic and the subscribers 203 register a subscription identified by topic. Other models that may be embodied in the architecture shown in FIG. 2 include clients 202 joining the network only as listeners; i.e., clients who are simply waiting for requests of callbacks. Publishing may be governed by a web service interface (not shown) interacting with the PubSub server 200, which facilitates the viewing and retrieval of the published material of the clients 202.

The PubSub system 201 shown in FIG. 2 can support a large number of dynamic senders (publishers) 202 and receivers (subscribers) 203. Senders 202 and receivers 203 are anonymous to each other in the information exchange network using the PubSub server 201, which acts as a message broker. Anonymity is not a requirement, however each member of the publish/subscribe community does not have to partake in the management of which peer is part of the community. Peers could be identified and gain the same advantage however leveraging known peer communities requires further management thereby increasing complexity. The broker 201 is the engine (i.e., framework) that manages connections to all the parties. Moreover, the broker 201 handles the repository of publishers 202 and subscribers 203, security (ACL (Access Control Lists)), message routing, and format transformation.

The broker 201 can be implemented in many different ways. The primary responsibility of the broker 201 is to transmit messages from one or many publishers 202 to one or many listeners/subscribers 203. In order to accomplish this task, the broker 201 requires knowledge of all the topics, listeners/subscribers 203, and publishers 202. In addition to this core data, user access controls are required to govern the broadcasting of messages or listening to topics. The broker 201 may use hash tables to store IDs, topics, subscribers, and access controls. When a publisher 202, which could also be a listener/subscriber 203, wants to send a message, a "publish message" is created and transmitted over a socket connection between a first system and the broker 201. As part of the transaction, the broker 201 validates the identity and authority to broadcast of the publisher 202 and only then transmits the message to every listener/subscriber 203. The methods by which to broadcast efficiently to listeners/subscribers 203 are well known to the art. The most basic, and unfortunately inefficient method, is to cycle through the list of all listeners/subscribers 203 and broadcast to each listener/subscriber 203 in turn. Furthermore, listeners/subscribers 203 initiate the relationship using a socket connection and upon successful registration subscribe to topics of interest. Topics might be defined as part of a configuration or dynamically generated upon connection or publishing. Root topics are often required to be formed in the configuration. Access controls are often managed through configuration files.

Figure 3:
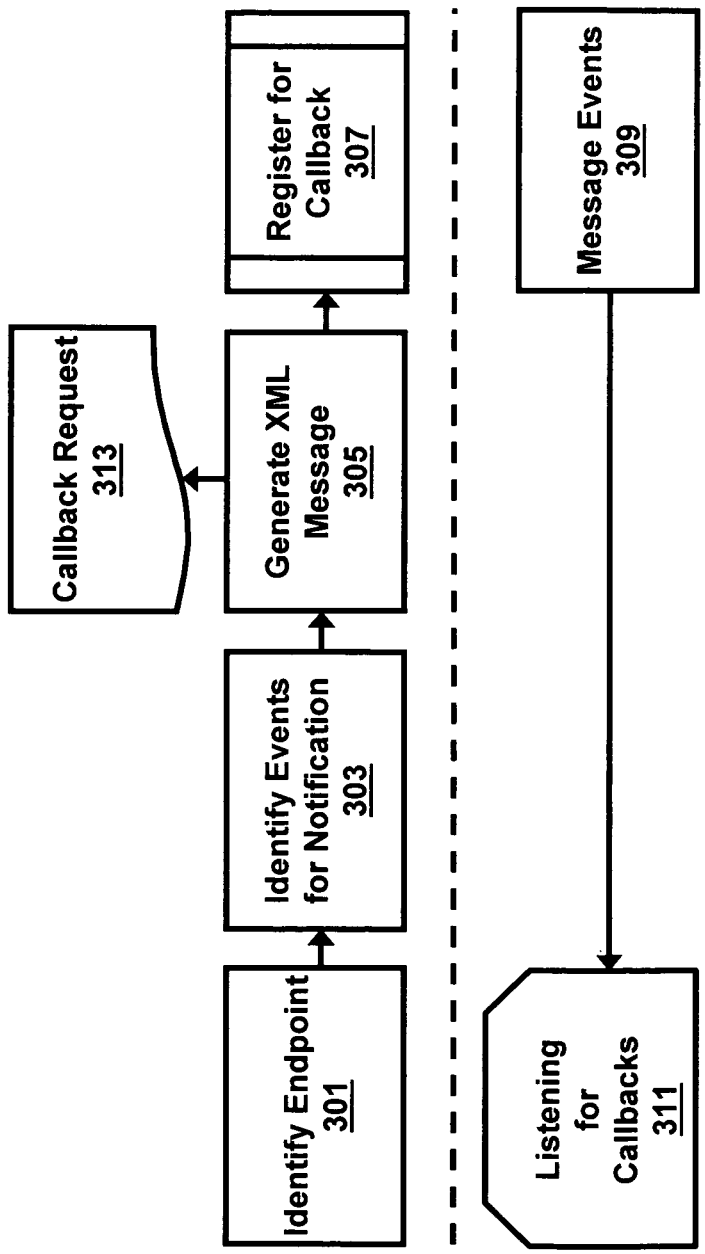
FIG. 3 is a schematic diagram illustrating an example of an event flow for registering for a callback according to an embodiment of the invention.

Registering for callbacks takes a different paradigm. In the PubSub model 200 shown in FIG. 2, the relationship between the clients 203 and PubSub server 201 is persistent. That is, each client 203 constantly maintains a connection to the PubSub server 201 to send and receive messages. Callbacks can be described in two ways: network callbacks and event listeners. Event listeners are liberally applied for graphical user interface (GUI) programming where actions fire off events triggering visual changes. More than one listener can be linked to any action. The event listener pattern is not limited to GUI programming. Network callbacks are similar in nature; however, the message exchange occurs over a network. FIG. 3 describes a possible event flow for the registration for a callback.

The process illustrated in FIG. 3 reads from left to right and from top to bottom. The process begins with identifying (301) the endpoints of the flow. In this context, the endpoint is both the target URI where a registration service is listening and waiting for requests, and the target listener is waiting for the callback. A URI is the generic term for all types of names and addresses that refer to objects, documents, and resources on a network. For example, a uniform resource locator (URL) is one type of URI.

A system running a callback has to know where to send the initial callback request to and where the callback event will be sent when and if the event occurs. Having identified the endpoints, the local application must identify (303) which events it requires notification of. Moreover, if this callback is in response to a message, it is possible that the message is submitting data for processing. Thereafter, an XML message is generated (305) representing the endpoints and the events that are required to complete the callback. The XML message format may be SOAP. The message is then sent (307) to the register callback interface (not shown). The bottom part of FIG. 3 shows that a client or another client is waiting (i.e., listening) (311) for callbacks of message events 309. The processing (313) of the callback request is further illustrated in FIG. 4.

Figure 4:
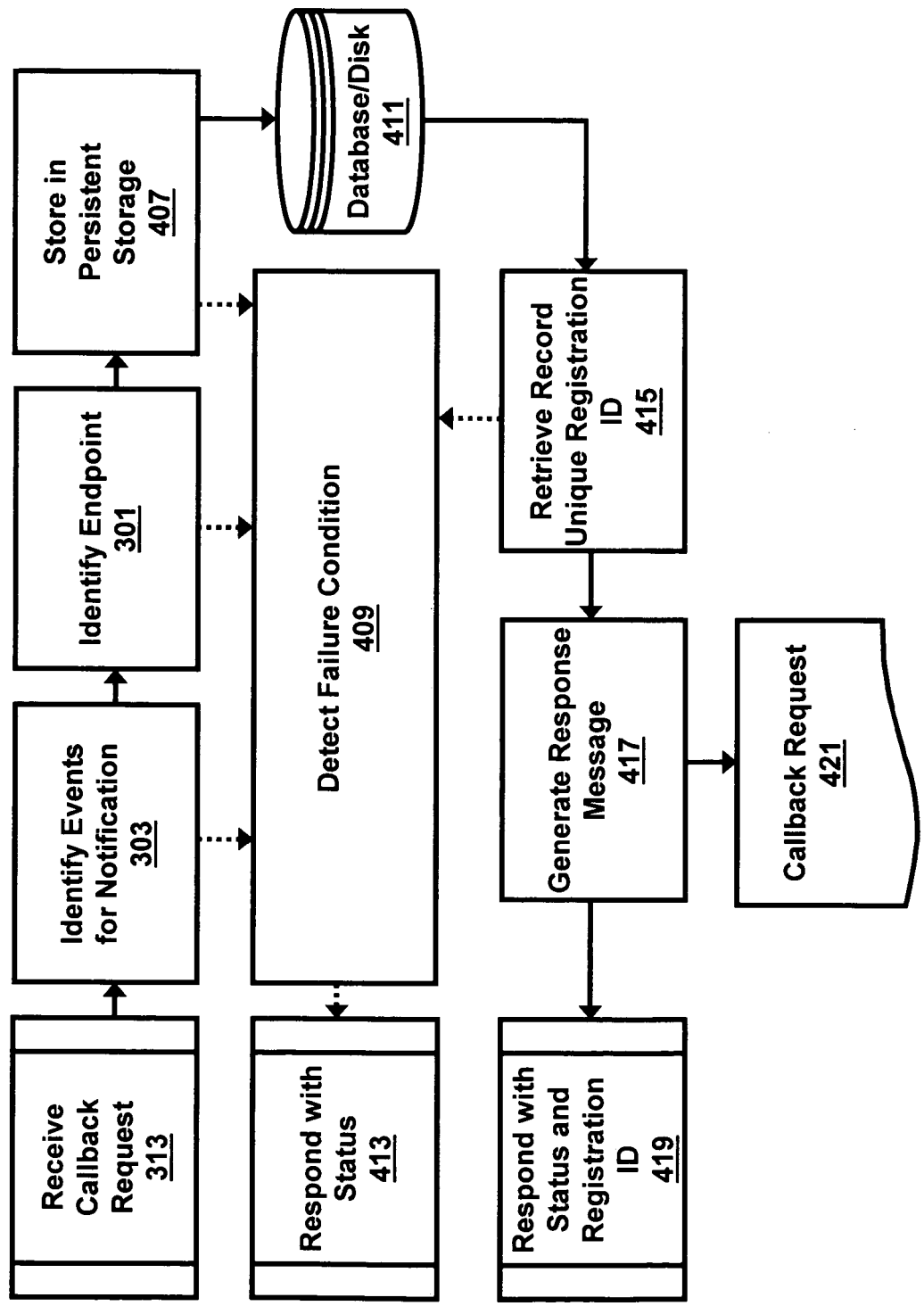
FIG. 4 is a schematic diagram illustrating an event flow showing the receipt of a callback request according to an embodiment of the invention.

The flow process illustrated in FIG. 4 reads from left to right and from top to bottom. The callback request process begins with receiving (313) the callback request (from FIG. 3), which correspondingly identifies (303) events for notification, which identifies (301) the endpoints. This validates the message inputs and stores the information into persistent storage of a database/disk 411. This acts as a synchronization point for multiple deployments of the web services broadcast engine and also allows for event registration to persist regardless of current availability. Current availability refers to the presence of a server or service being available for consumption or exploitation. If the server or service is unavailable, the features and functions performed by the server or service are considered unavailable. If there is an error in any of the validation or storage procedures, an error message comprising a notice of a detection of a failure condition is generated (409) and is returned (413) to the requesting system. Upon successful storage of the request, a unique registration identification number (ID) for that callback request is retrieved (415), a response message is generated (417), and the ID is returned (419) as part of the response message to the requesting call. Moreover, this ID can be used later to identify, cancel, or modify the callback request 421.

Tracking messages is a common issue with high volume asynchronous transactions. To support this need the broadcast engine 503 provided by the embodiments of the invention, and best seen in FIG. 5, will maintain or add tracking information, which comprise correlation IDs and transaction IDs. More particularly, the broadcast engine 503 assigns an identifier per transaction which may comprise of a globally unique identifier that can both be queried upon and referenced to address a specific transaction. This identifier is stored as part of all persistent data 411 (shown in FIG. 4) and future communication.

The identifier is attached to all communication to maintain correlation of activity. Requesting systems can use these identifiers to query or modify the state of "in process" requests. A first or second system might receive a correlation identifier and leverage the identifier to correlate results or state information to other systems. For example, a first system might leverage the unique identifier as a key in a ledger. A second system might receive the resulting callback of the first system's request. The identifier is used as a tracking number for the first system in the second systems services.

These identifiers can be generated by the calling application or can be provided by the broadcast engine 503. The broadcast engine 503 using persist mapping 507 of all of the identifiers for maximum interoperability. Specifically, the broadcast engine 503 persists the mapping 507 of unique identifiers. Alternatively, a first or second system might provide such a unique identifier while the broadcast system might require its own internal mapping. This correlation between a first or second systems identifier and the broadcast identifier is a simple lookup table.

Figure 5:
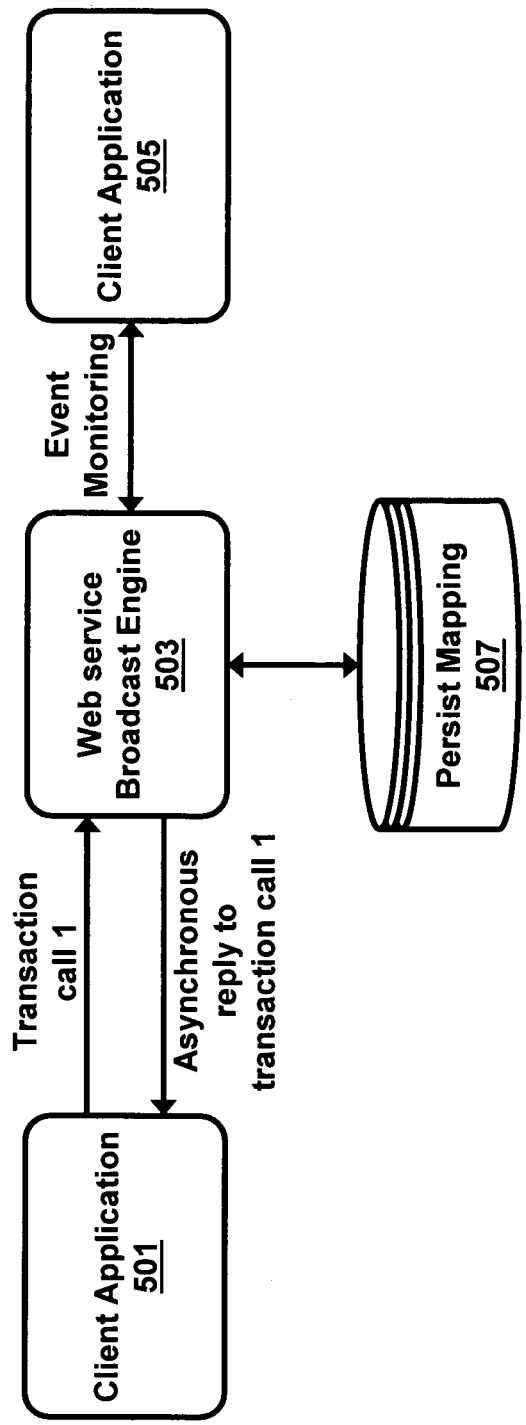
FIG. 5 is a schematic diagram illustrating a technique of tracking asynchronous messages according to an embodiment of the invention.

As seen in FIG. 5, the broadcast engine 503 has more than one client 501, 505 registered for callbacks or asynchronous event notification. Thus, the broadcast engine 503 uniquely identifies the registering applications 501, 505 and events to optimize grouping and distribution. Generally, as shown in FIG. 5, the client application 501 posts a SOAP message to the broadcast engine 503. The SOAP message contains a pre-generated tracking ID (see FIG. 6). More particularly, FIG. 6 describes an example of a sample SOAP message for a mail delivery system. The header defines a correlation identifier to link the delivery information to other transactions or records. In a multi-step asynchronous operation, a first step might be to place an order and a second step might be to submit delivery information. The correlation identifier allows for a first transaction to be related to a second transaction which makes up the larger operation.

This tracking ID is used as part of any response to help the registering application to identify which message any given asynchronous response is in reference to. The broadcast engine 503 then returns a unique ID to the client application 501 as part of the initial registration. However, this ID is intended for use in tracking follow-on messages with the broadcast engine 503. For example, to remove a registered callback, the ID will need to be presented as part of the SOAP message. Obviously, the broadcast ID might be used by the register application as its internal tracking number. Client application 505 is a second client registering for events of the first client 501. This client application 505 might be embodied as another system or process looking to further process event messages. For example, upon completion of an event, the broadcast engine 503 might incur costs to the requester 501. In this case, client 505 might be the billing application.

Figure 7:
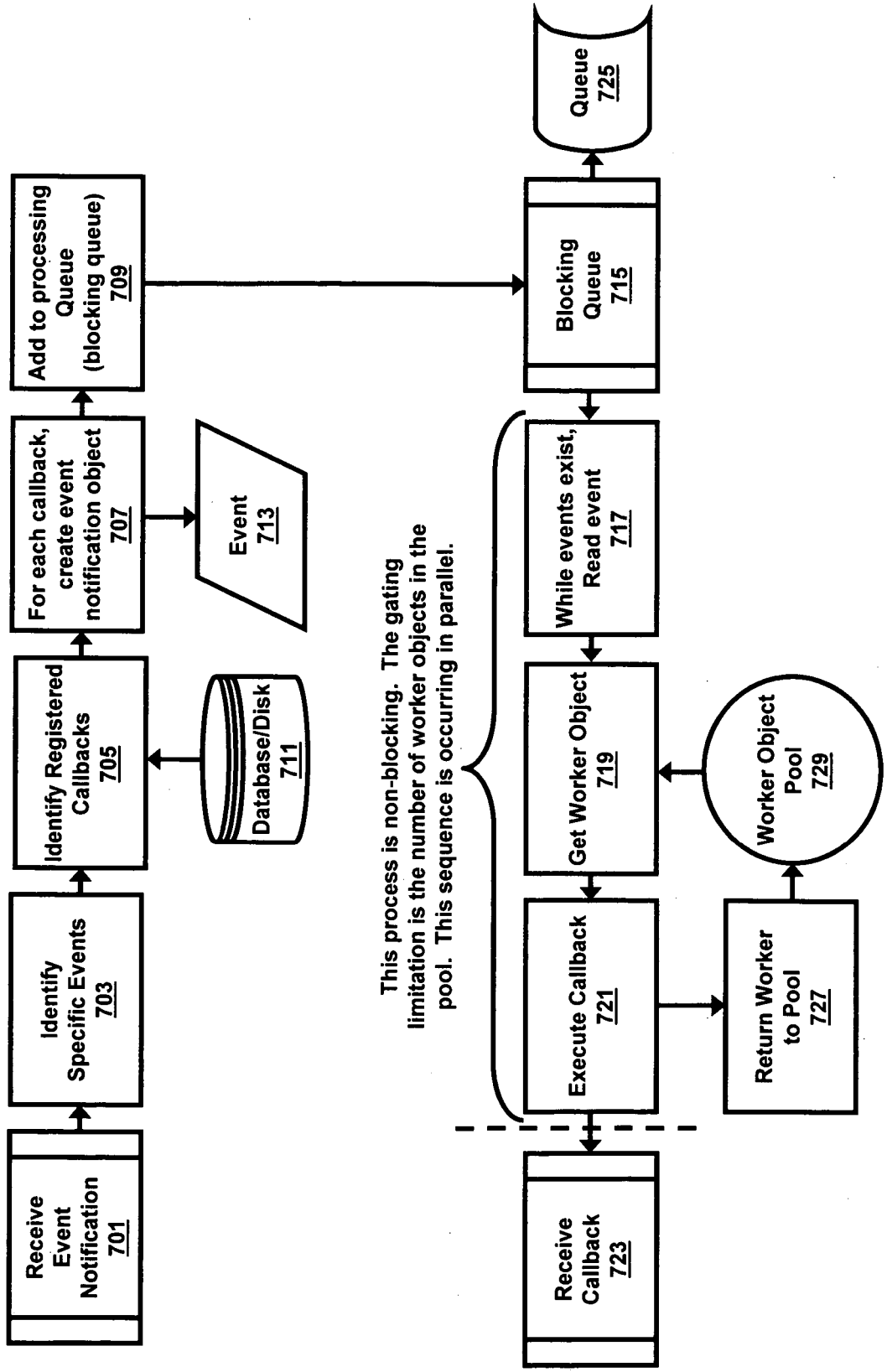
FIG. 7 is a schematic diagram illustrating an event flow responding to an event notification according to an embodiment of the invention.

FIG. 7 describes the asynchronous and parallel portions of the system provided by the embodiments of the invention. The flow process illustrated in FIG. 7 reads from left to right and from top to bottom. Event messages are submitted to the system, either through direct method calls or via a service interface (not shown). Method calls could be kicked off by application events or by processing from an initial request. The flow begins by receiving (701) an event notification and identifying the various parts of the messages including identifying (703) the specific events and endpoints and identifying (705) which events and endpoints are registered for callbacks. For each of these callbacks an event object is created (707) and queued (709) identifying the message to be sent and the list of endpoints that need to receive it. In order for process (705) to identify registered clients for callbacks it looks to a datastore 711. The datastore 711 could be embodied as random access memory (RAM) or a database/disk. For each of the registered clients a message will be created (as generally indicated by event 713. Alternatively, the same event object 713 will be used for all clients. The queue 725 may be embodied as a blocking queue 715. The blocking queue 715 does not process when the queue 725 is empty, rather the blocking queue 715 is event driven. The alternative is to poll to see if there is anything in the queue 725 for processing. However, polling tends to be an inefficient process because polling increases the load on both a client and more often the server. Clients need to maintain a process of checking and servers are required to handle the request and response even if the response has not changed. The additional process on both ends utilizes resources without any realizable gains.

The second part of the flow happens in parallel and is limited only by the number of worker objects to handle the event broadcasts. Worker objects are threaded pieces of code that perform some action with the queued item. In this case, the worker objects are managing the socket connections to the registered endpoints. While events exist in the queue, the events are read (717) and dispatched (719) to worker objects. The worker objects then execute (721) the callbacks. The worker objects are returned (727) to the worker object pool 729) at the end of processing. Moreover, upon execution (721) of the callbacks, the registered endpoints receive (723) the callbacks.

A worker object creates messages appropriate to the protocol data stored in objects such as event 713. Alternatively, the worker object might create a new message format as described by the requesting service appropriate for the consumption of the target of the callback, wherein the target is the recipient of the message. In the preferred embodiment, the work object is creating SOAP messages with data contained in event 713. Alternatively, event 713 is the entire message and the worker is simply transmitting the message. The transmission of the message 721 is comprised of opening a socket between the broadcast system worker object and the target or recipient of the callback message. The message is transmitted over the network. In a preferred embodiment, this worker object is making a SOAP call to a web service endpoint capable of receiving a message of the type represented by the callback message.

The worker object pool 729 offers a reusable finite resource of worker objects. There are costs associated with the creation of worker objects including time and memory consumption. To enhance performance, a pool 729 of previously created objects are used and returned to the pool 729. When there are no objects available, the system waits until one becomes available. The size of the pool 729 can be tuned to optimize resource consumption and worker object availability.

However, it is possible that the endpoint is not reachable. If such a situation exists, depending on the specification of the message (e.g. guaranteed (a message that is sent until confirmation receipt) or fire and forget (a method of prioritizing throughput over guaranteed delivery)), the message might be stored in another queue for additional processing at a later date.

Figure 8:
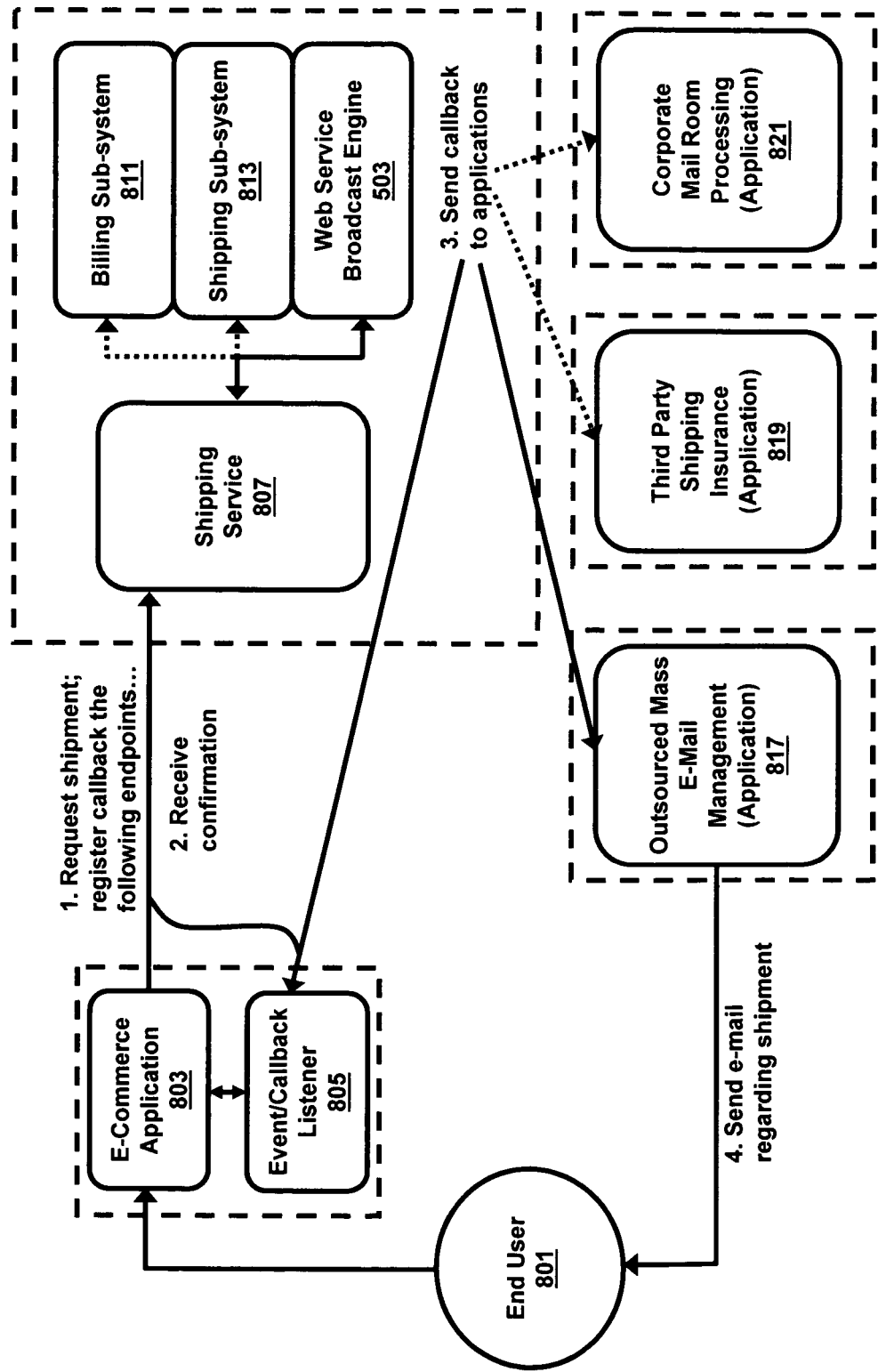
FIG. 8 is a schematic diagram illustrating an example of implementing a web service broadcast engine according to an embodiment of the invention.

FIG. 8 illustrates the role of the web service broadcast engine 503 in a business to business (B2B) scenario. FIG. 8 is read starting from left to right and from top to bottom. An end user 801 places an order to an e-commerce site running an application. The e-commerce application 803 performs all of the required steps to complete a purchase transaction. As part of the purchase workflow, shipping will need to be arranged. The e-commerce application 801 outsources this function to a global shipping company 807 (which includes the broadcast engine 503. The e-commerce application 801 also outsources all of its mailing list, order confirmation and return authorization support services (depicted in FIG. 8 as outsourced mass e-mail management 817.

The e-commerce application 803 initiates a request to schedule which items from which warehouse and by what method to ship. The e-commerce application 803 also registers which endpoints should be notified when events occur pertaining to the shipment request. Specifically, a notification should be sent to the mass e-mailing company 817 (or a corporate mail room 821 or a third part insurer 819, which the e-commerce application 803 uses. Then, the shipping provider 807 returns an asynchronous confirmation allowing the e-commerce application 803 to associate its user to the order and the order to the shipment request. The e-commerce application 803 registers itself as one of the entities to receive event change notifications. Next, once the shipment has occurred, an event is fired in the shipping company's system to broadcast notification to several registered endpoints. The e-commerce application 803 also has a registered event listener 805 to provide real-time updates to the database system and web site.

The outsourced mass e-mail management company/application 817 receives the notification, and it knows enough information about the sender and the order to send a customized email to the recipient 801. Moreover, the outsourced mass e-mail management application 817 attaches the tracking number to provide easy access to the shipment status.

The billing sub-system 811 is illustrated to describe any or all functionality the larger application requires in order to perform billing functions. Similarly, the shipping sub-system 813 represents any and all functionality for the larger application to perform shipping capabilities. These subsystems might be incomplete and are complimented by third and fourth systems such as 817, 819, or 821.

Figure 9:
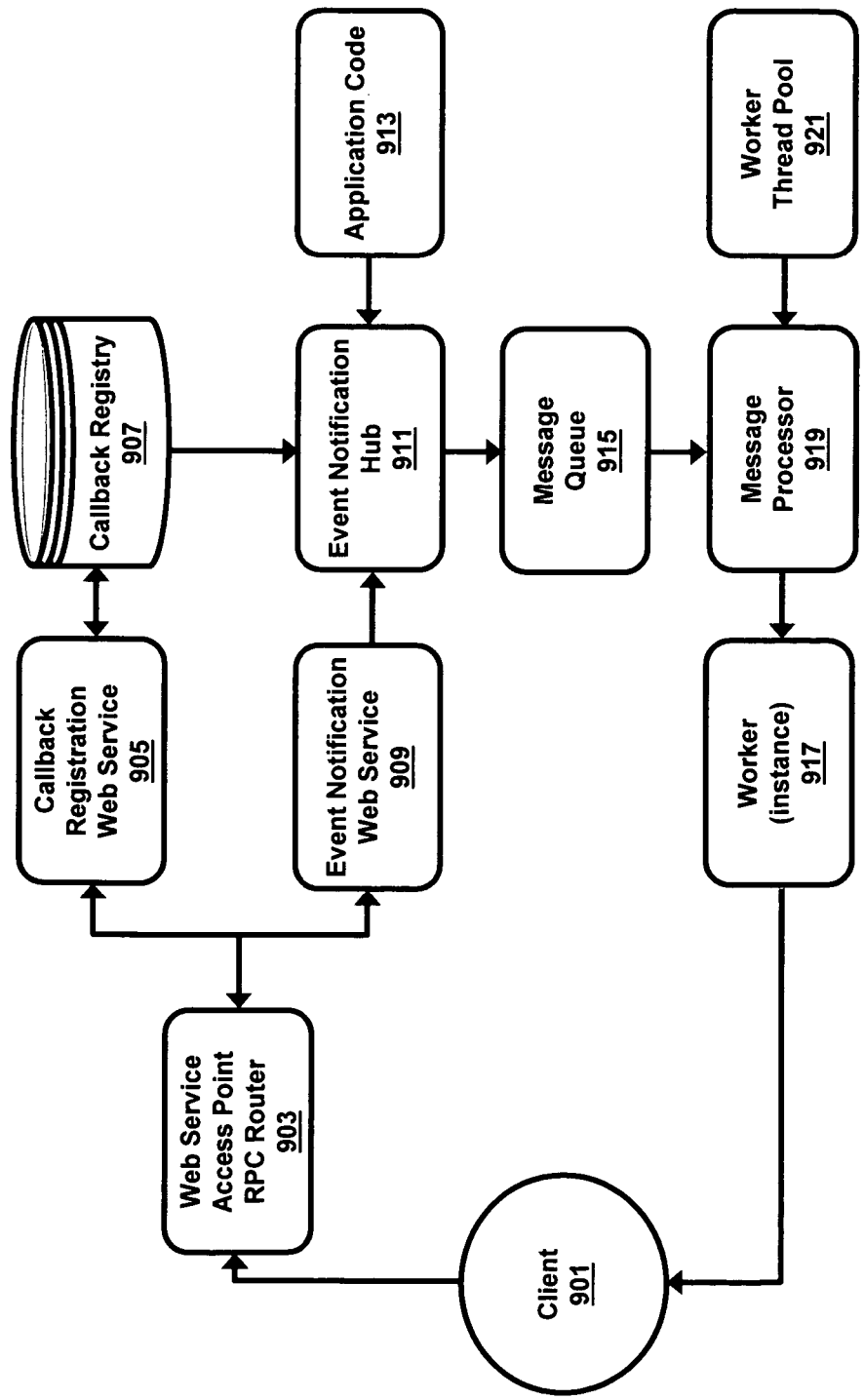
FIG. 9 is a schematic diagram of a high level component architecture highlighting notification flow according to an embodiment of the invention.

FIG. 9 describes an event flow process from a high-level application component architecture perspective. FIG. 9 represents the schematics to build an end-to-end asynchronous broadcast callback sub-system. In FIG. 9, component 901 represents a client component registering for notification of a request or the event notification itself. It might be a standalone client or a component of a larger system. Component 903 represents a web service access point. This is typically a web application capable of receiving requests from clients. In a preferred implementation, this is an RPC router, which is a specialized servlet used to perform the minimal tasks necessary to begin handling the transaction. Component 903 acts as a router of messages and in the case of FIG. 9 routes between the registering of listeners and alerting of event processes and objects.

Component 905 represents an object or process for processing registration of a given client 901 to an event. This process or object containing the process stores the registration information handled by the web service access point 903 and supplied by client 901 in memory, a database, or a disk. Component 907 illustrates the storage required to maintain and manage the list of registered listeners, while component 909 represents an object or process for initiating an event occurrence message. Component 909 communicates with component 911 to begin the broadcast. Component 911 is the event notification hub which identifies all the recipients for a given message and optionally adds messages to be broadcast to a queue 915. The event notification hub 911 leverages the data source defined by the storage 907 to identify all relevant event recipients. Moreover, the event notification hub 911 might alternatively send each message to the message processor 919.

Component 913 represents the application code illustrating that event generation need not come from a client 901 but instead may come from other executing code. Component 919 is representative of the message processor which takes messages and has the messages transmitted with the aid of worker threads 917 stored in component 921. Alternatively, more than one processor might exist. Still alternatively, a processor might interact directly with the event notification hub 911. In FIG. 9, component 917 is a representation of the work thread stored in component 921 and leveraged by the message processor 919.

Figure 10:
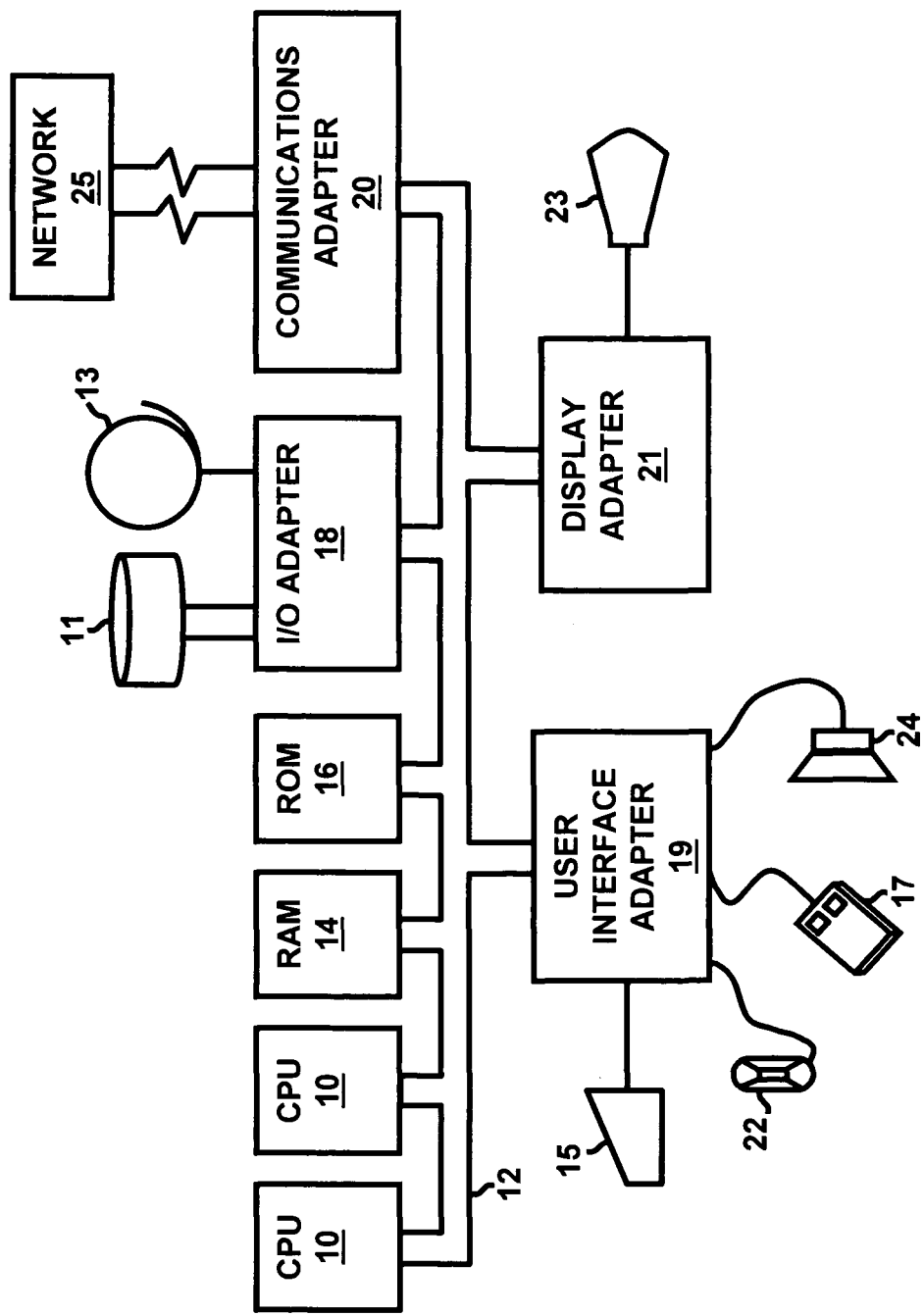
FIG. 10 is a computer system diagram according to an embodiment of the invention.

A representative hardware environment for practicing the embodiments of the invention is depicted in FIG. 10. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Emerging standards currently cover the need for a web services callback mechanism. The embodiments of the invention provide an architecture, system, method and code for communicating a web service response in an asynchronous broadcast. In an enterprise environment, the embodiments of the invention gain efficiencies over the conventional systems by eliminating the dependency on persistent connections. Furthermore, the likelihood that a callback or event notification is desired by more than one application in an enterprise is high and, as such, the system provided by the embodiments of the invention address that need by mapping events to registered callbacks and processing them in a parallel asynchronous manner.

Generally, the embodiments of the invention provide a system, computer architecture, and method of enabling asynchronous callback and broadcast notification between a server 903 (shown as a RPC router 903 in FIG. 9) and a client software application 901 in a web services network. The embodiments of the invention achieve this by utilizing the server 903 for processing computer logic instructions and utilizing an endpoint client software application 901 for requesting the server 903 for a notification of a completion of the processing of the computer logic instructions. A registry 907 in the server 903 is utilized for storing the notification request. Moreover, a queue 915 is provided for queuing the notification request according to a response to the notification request and a list of user endpoints requesting the notification of a completion of the processing of the computer logic instructions. Thereafter, a message processor 919 is adapted to notify the client software application 901 of the completion of the processing of the computer logic instructions upon execution of the queued notification request.

The embodiments of the invention could be implemented in any number of different environments including, but not limited to workflow management systems, inventory control systems, data update management systems, cache synchronization systems, and in system integration environments through the registering of a third party recipient of a callback or event notification. Moreover, the embodiments of the invention could be implemented in several different industries including, but not limited to shipping, automotive, life sciences, aerospace and defense, chemical and petroleum, energy and utilities, financial markets, healthcare, insurance, and wholesale distribution and services industries, among others.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A method of enabling asynchronous callback and broadcast notification between a server and a client software application in a network, said method comprising:
    processing computer logic instructions in said network;
    requesting, by said client software application, a notification of a completion of said processing of said computer logic instructions and identifying a system endpoint requiring notification of completion of said processing of said computer logic instructions;
    storing the notification request in a registry;
    queuing said notification request according to a response to said notification request and a list of system endpoints requesting said notification of said completion of said processing of said computer logic instructions; and
    notifying a recipient system of said completion of said processing of said computer logic instructions upon execution of the queued notification request.

2. The method of claim 1, wherein in the requesting process, said notification comprises a callback request.

3. The method of claim 1, wherein in the notifying process, said recipient system comprises said client software application corresponding with said system endpoints.

4. The method of claim 1, wherein the requesting process comprises:
    sending the notification request to said server;
    specifying computer logic instructions requiring notification for an identified system endpoint;
    generating a message of the specific computer logic instructions requiring notification; and
    sending said message to a register notification interface.

5. The method of claim 4, wherein in the identifying process, said system endpoint comprises a target Uniform Resource Identifier (URI).

6. The method of claim 4, wherein said requesting process further comprises:
    storing said message into a storage device;
    generating a unique identifier for said specific computer logic instructions requiring notification; and
    generating a response message by matching said unique identifier with a corresponding system endpoint requiring notification of completion of said processing of said computer logic instructions.

7. The method of claim 6, further comprising tracking said response message using persistent mapping to track said unique identifier in said network.

8. The method of claim 1, wherein the storing process comprises creating an event object for each notification request.

9. The method of claim 1, wherein in the requesting process, said notification comprises at least one event object.

10. The method of claim 1, wherein said execution of the queued notification request comprises managing a socket connection between said server and said client software application.

11. The method of claim 1, wherein in the notifying process, said recipient system is different from said client software application.

12. The method of claim 1, wherein in the notifying process, said recipient system comprises said client software application.

13. A program storage device readable by computer, tangibly embodying a program of instructions executable by said computer to perform a method of enabling asynchronous callback and broadcast notification between a server and a client software application in a network, said method comprising:
    processing computer logic instructions in said network;
    requesting, by said client software application, a notification of a completion of said processing of said computer logic instructions and identifying a system endpoint requiring notification of completion of said processing of said computer logic instructions;
    storing the notification request in a registry;
    queuing said notification request according to a response to said notification request and a list of system endpoints requesting said notification of said completion of said processing of said computer logic instructions; and
    notifying a recipient system of said completion of said processing of said computer logic instructions upon execution of the queued notification request.

14. The program storage device of claim 13, wherein in the requesting process, said notification comprises a callback request.

15. The program storage device of claim 13, wherein in the notifying process, said recipient system comprises said client software application corresponding with said system endpoints.

16. The program storage device of claim 13, wherein the requesting process comprises:
    sending the notification request to said server;
    specifying computer logic instructions requiring notification for the identified system endpoint;
    generating a message of the specific computer logic instructions requiring notification; and
    sending said message to a register notification interface.

17. The program storage device of claim 16, wherein in the identifying process, said system endpoint comprises a target Uniform Resource Identifier (URI).

18. The program storage device of claim 16, wherein said requesting process further comprises:
    storing said message into a storage device;
    generating a unique identifier for said specific computer logic instructions requiring notification; and
    generating a response message by matching said unique identifier with a corresponding system endpoint requiring notification of completion of said processing of said computer logic instructions.

19. The program storage device of claim 18, wherein said method further comprising tracking said response message using persistent mapping to track said unique identifier in said network.

20. The program storage device of claim 13, wherein the storing process comprises creating an event object for each notification request.

21. The program storage device of claim 13, wherein in the requesting process, said notification comprises at least one event object.

22. The program storage device of claim 13, wherein said execution of the queued notification request comprises managing a socket connection between said server and said client software application.

23. The program storage device of claim 13, wherein in the notifying process, said recipient system is different from said client software application.

24. The program storage device of claim 13, wherein in the notifying process, said recipient system comprises said client software application.

25. A web service broadcast engine for enabling asynchronous callback and broadcast notification between a server and a client software application in a network, said web service broadcast engine comprising:
- means for processing computer logic instructions in said network;
- means for requesting, by said client software application, a notification of a completion of said processing of said computer logic instructions, and a system endpoint requiring notification of completion of said processing of said computer logic instructions;
- means for storing the notification request in a registry;
- means for queuing said notification request according to a response to said notification request and a list of system endpoints requesting said notification of said completion of said processing of said computer logic instructions; and
- means for notifying a recipient system of said completion of said processing of said computer logic instructions upon execution of the queued notification request.

26. A system for enabling asynchronous callback and broadcast notification between a server and a client software application, said system comprising:
- a server adapted to process computer logic instructions in a network;
- an endpoint client software application adapted to request said server for a notification of a completion of said processing of said computer logic instructions; and
- a first computer architecture component adapted to identify a system endpoint requiring notification of completion of said processing of said computer logic instructions;
- a registry in said server adapted to store the notification request;
- a queue adapted for queuing said notification request according to a response to said notification request and a list of system endpoints requesting said notification of said completion of said processing of said computer logic instructions; and
- a message processor adapted to notify a recipient system of said completion of said processing of said computer logic instructions upon execution of the queued notification request.

27. The system of claim 26, wherein said notification comprises a callback request.

28. The system of claim 26, wherein said client software application corresponds with said system endpoints.

29. The system of claim 26, wherein said server comprises:
- a second computer architecture component adapted to specify computer logic instructions requiring notification for the identified system endpoint; and
- a register notification interface adapted to process a message of the specific computer logic instructions requiring notification.

30. The system of claim 29, wherein said system endpoint comprises a target Uniform Resource Identifier (URI).

31. The system of claim 29, wherein said server further comprises:
- a persistent storage device adapted to store said message; and
- a unique identifier for said specific computer logic instructions requiring notification,
- wherein said message processor is adapted to generate a response message by matching said unique identifier with a corresponding system endpoint requiring notification of completion of said processing of said computer logic instructions.

32. The system of claim 31, wherein said server is adapted to track said response message using persistent mapping to track said unique identifier until said notification reaches said system endpoint.

33. The system of claim 26, wherein said registry is adapted to create an event object for each notification request.

34. The system of claim 26, wherein said notification comprises at least one event object.

35. The system of claim 26, wherein said message processor is adapted to manage a socket connection between said server and said client software application.

36. The system of claim 26, wherein said recipient system is different from said client software application.

37. The system of claim 26, wherein said recipient system comprises said client software application.

38. The system of claim 26, wherein said network comprises a web services network.

* * * * *